United States Patent
Liu et al.

(10) Patent No.: US 11,940,972 B2
(45) Date of Patent: Mar. 26, 2024

(54) EXECUTION OF OPERATIONS ON PARTITIONED TABLES

(71) Applicant: SAP SE, Walldorf (DE)

(72) Inventors: Xiaoke Liu, Xi'an (CN); Zhilong Hao, Xi'an (CN); Weimin Qi, Xi'an (CN); Zhe Qu, Xi'an (CN); Jiaxin Liu, Xi'an (CN); Qingwei Ren, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/826,974

(22) Filed: May 27, 2022

(65) Prior Publication Data

US 2023/0385263 A1   Nov. 30, 2023

(51) Int. Cl.
  *G06F 16/23*   (2019.01)
  *G06F 16/22*   (2019.01)
  *G06F 16/2455*  (2019.01)

(52) U.S. Cl.
  CPC ...... *G06F 16/2308* (2019.01); *G06F 16/2282* (2019.01); *G06F 16/24554* (2019.01)

(58) Field of Classification Search
  CPC .................................................. G06F 16/2308
  USPC ......................................................... 707/703
  See application file for complete search history.

(56) References Cited

U.S. PATENT DOCUMENTS

| | | | |
|---|---|---|---|
| 6,275,898 B1 | 8/2001 | Dekoning | |
| 9,026,765 B1 | 5/2015 | Marshak et al. | |
| 11,308,066 B1 | 4/2022 | Li et al. | |
| 11,640,391 B2* | 5/2023 | Loaiza | H04L 9/0643 707/703 |
| 2004/0141509 A1 | 7/2004 | Sahni et al. | |
| 2004/0267782 A1* | 12/2004 | Nakano | G06F 16/2282 |
| 2007/0143564 A1 | 6/2007 | Uppala | |
| 2009/0260016 A1 | 10/2009 | Ramakrishnan et al. | |
| 2014/0279961 A1 | 9/2014 | Schreter et al. | |
| 2014/0324881 A1 | 10/2014 | Ransil et al. | |
| 2015/0106407 A1* | 4/2015 | Adayilamuriyil | G06F 16/2282 707/804 |
| 2015/0261807 A1* | 9/2015 | Pathak | G06F 16/1774 707/704 |
| 2016/0350392 A1* | 12/2016 | Rice | G06F 16/278 |
| 2018/0300385 A1 | 10/2018 | Merriman et al. | |
| 2019/0340260 A1* | 11/2019 | Eberlein | G06F 16/278 |
| 2020/0042399 A1 | 2/2020 | Kuang et al. | |

(Continued)

*Primary Examiner* — Muluemebet Gurmu
(74) *Attorney, Agent, or Firm* — Fountainhead Law Group P.C.

(57) ABSTRACT

Computer-readable media, methods, and systems are disclosed for utilizing partition-based locking mechanisms to improve execution of overlapping data definition language (DDL) and data manipulation language (DML) operations on a partitioned database table. A first node receives a DML statement associated with a first transaction. The first node acquires a intent exclusive lock on table metadata. A second node receives a DDL statement associated with a second transaction and acquires an exclusive metadata lock on the partitioned table metadata. Next, an intent exclusive lock is acquired for the relevant partition table data on the second node and an exclusive lock on table metadata on the second node. The second transaction waits for the DML operation of the first transaction to complete. Then the first transaction is committed. Finally exclusive locks are acquired on table data and metadata and the second transaction is executed and committed.

20 Claims, 6 Drawing Sheets

(56) References Cited

U.S. PATENT DOCUMENTS

| | | |
|---|---|---|
| 2021/0081453 A1 | 3/2021 | Eadon et al. |
| 2022/0215010 A1* | 7/2022 | Dash .................. G06F 18/2137 |
| 2022/0264136 A1 | 8/2022 | Chen |
| 2023/0129468 A1 | 4/2023 | Liu et al. |

* cited by examiner

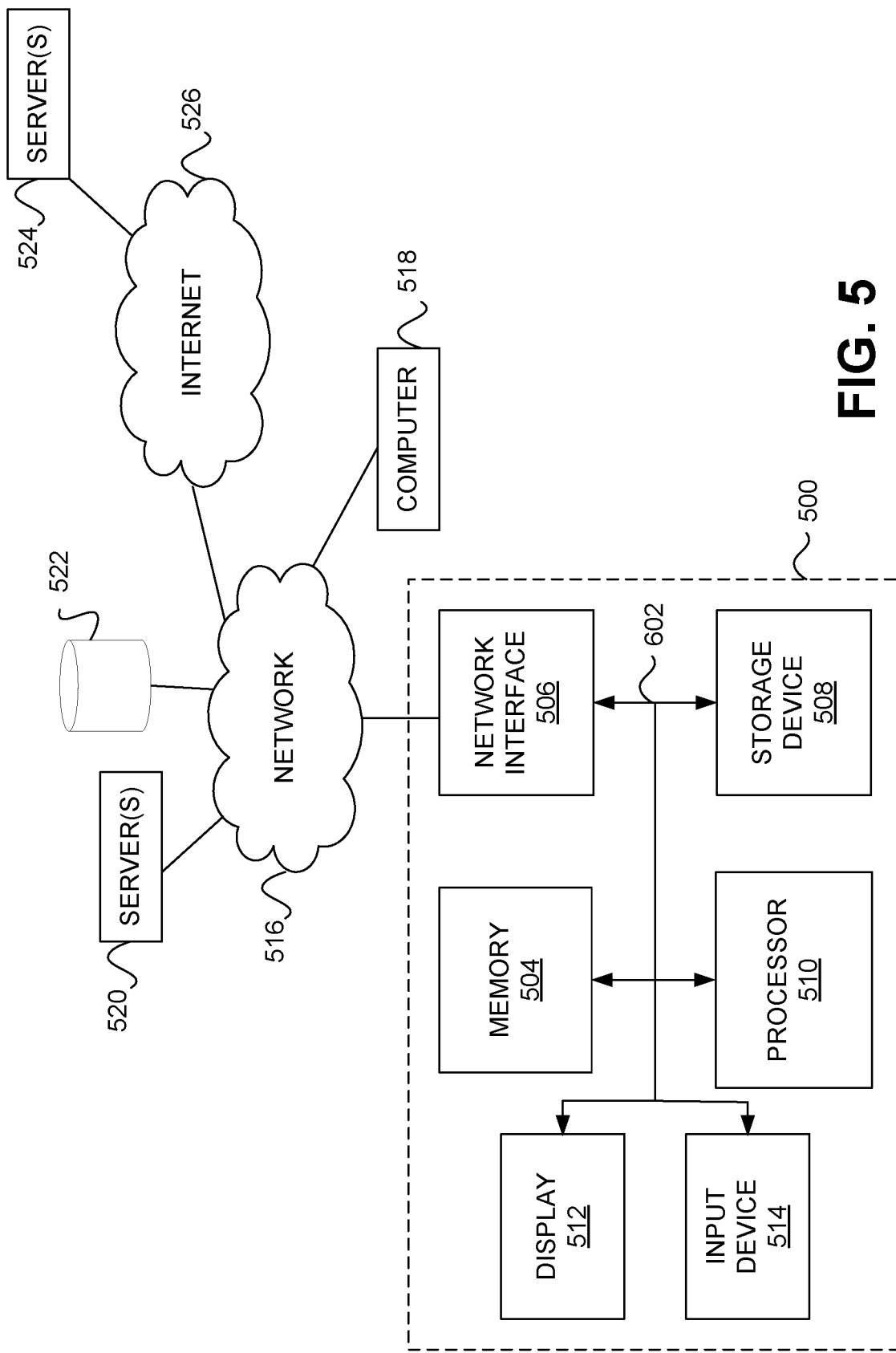

EXECUTION OF OPERATIONS ON PARTITIONED TABLES

TECHNICAL FIELD

Embodiments generally relate to improved execution of partition-related operations in database management systems, and more particularly to utilizing partition-based locking mechanisms to improve execution of overlapping data definition language (DDL) and data manipulation language (DML) operations.

In modern database systems, there is often a strong demand for storing a large amount of data in a single table, which is a common user requirement, and can help simplify database modeling. In existing database management systems, there are typically design limitations with respect to a maximum number of records that a single table can store. Accordingly, database administrators have a requirement to split their data into separate tables to overcome a corresponding limitation regarding a number of records that can be stored in a single table. Corresponding problems are encountered in response to a requirement to query data over multiple tables, i.e., by way of a relational database management system join. To provide greater record storage and an overall improved user experience, there is a need for mechanisms to overcome such limitations. One such mechanism involves the use of partitioned table. In some database management systems, a partitioned table consists of multiple internal database tables, each internal table serving as a logical partition. As such a partitioned table can hold many more records than a single conventional database table. Partitioned tables may also be replicated across multiple database server nodes running on multiple database server hosts.

To enable consistency and effectiveness of concurrently executed database transactions, table locking may be employed in connection with database management systems. When conventional table locking mechanisms are employed in connection with partitioned tables, parallel transactions may result in deadlocks, such as when a DDL operation and a DML operation are executed parallelly in a distributed database server environment.

Accordingly, what is needed is a method for utilizing partition-based locking mechanisms to improve execution of overlapping data definition language (DDL) and data manipulation language (DML) operations, thereby addressing the above-mentioned problem.

SUMMARY

Disclosed embodiments address the above-mentioned problems by providing one or more non-transitory computer-readable media storing computer-executable instructions that, when executed by a processor, perform a method for utilizing partition-based locking mechanisms to improve execution of overlapping data definition language (DDL) and data manipulation language (DML) operations on a partitioned database table, the method comprising: receiving, by a first database node, one or more DML statements associated with a first transaction on a first table partition, acquiring, by the first database node, a first-node intent exclusive lock on table metadata associated with the partitioned database table for the first transaction, in response to receiving, by a second database node, one or more DDL statements associated with a second transaction operating on the partitioned database table: acquiring, by the second database node, a second-node exclusive lock on second-node table metadata associated with the partitioned database table, acquiring, by the second database node, a second-node intent exclusive lock on table data of the first table partition, acquiring, by the first database node, a first-node exclusive lock on first-node table metadata, executing, by the second database node, operations associated with the one or more DML statements, and in response to determining that the operations associated with the one or more DML statements have successfully completed, committing the second transaction, acquiring, by the first database node, an exclusive lock on first-node table metadata data, acquiring, by the second database node, an all-partition exclusive lock on table data of each of the partitions of the partitioned table, executing, by the first database node, operations associated with the one or more DDL statements, and in response to determining that the operations associated with the one or more DDL statements have successfully completed, committing the first transaction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 5 is a diagram illustrating a sample computing device architecture for implementing various aspects described herein.

Figure 1:
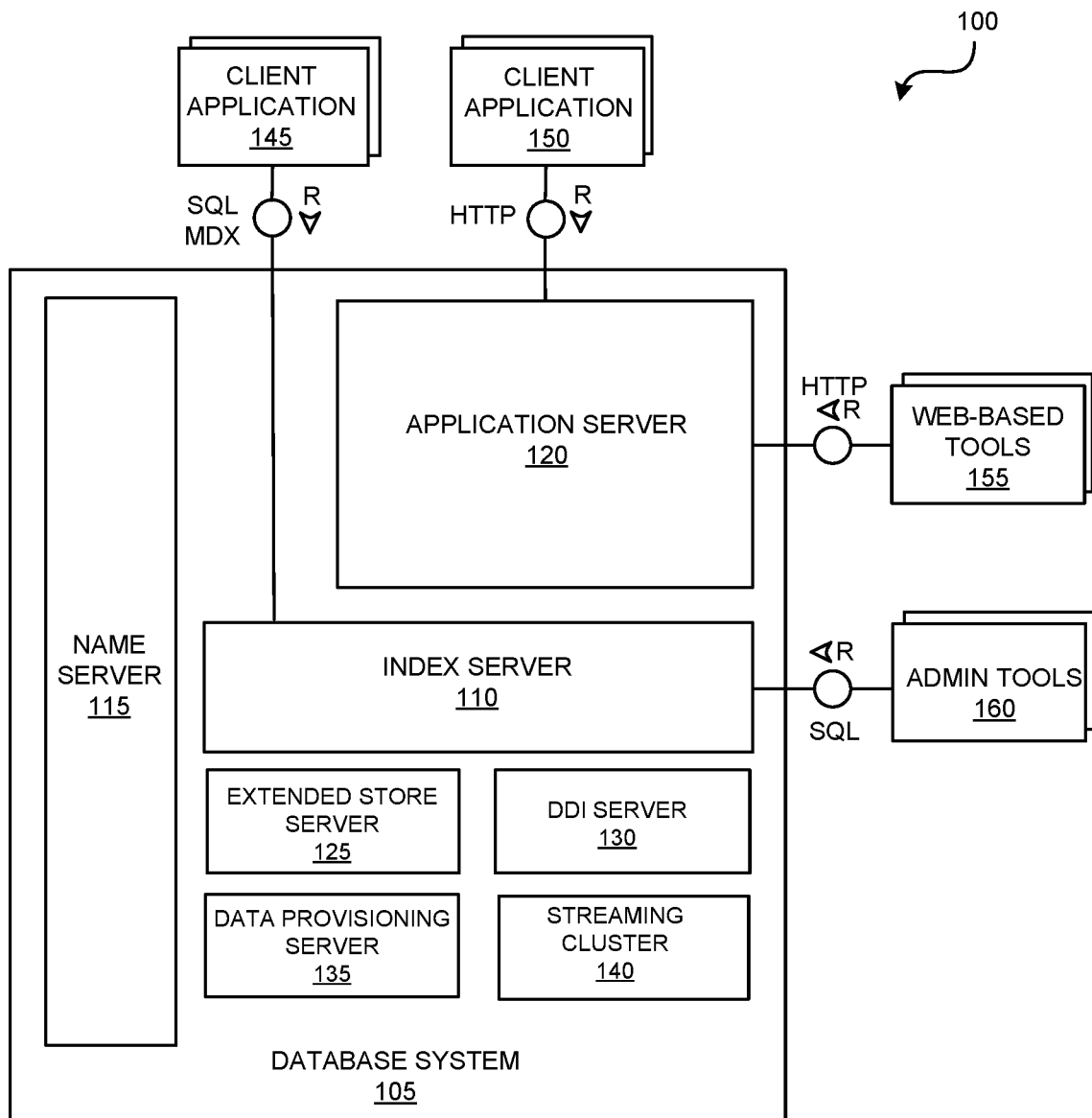
FIG. 1 is a system diagram illustrating an example database system for use in connection with the current subject matter.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Ideally partitioned database tables would appear the same as non-partitioned database from the perspective of a database user or database system administrator. When such users experience partition-related deadlocks associated with parallel DML/DDL statements, such deadlocks introduce a downside to the use of a partitioned table. When a deadlock occurs, users may experience a delay and then an error message as a background process in the database management system detects the deadlock and cancels one or more of the deadlocking transactions. Thus users may notice that they are using a partitioned table due to this delay and/or error message. To solve this problem, partition locking mechanisms consistent with the present teachings may be implemented. Such methods separate a traditional table lock into a metadata lock and a data lock, thereby changing associated lock rules in connection with the execution of DDL and DML operations. Employing partition locking as described below, eliminates a whole category of database system deadlocks associated with parallel DML and DDL running against a partitioned database table.

Not only do the partition locking mechanisms of the present teachings avoid partition-based deadlock problems in database systems employing partitions, but these partition locking mechanisms also have the benefit of improving transaction execution. In some cases, DDL/DML statements may run concurrency in connection with database management systems. Using partition locking, many partition-related DDL/DML statements can be improved to require locking only metadata and data partitions of certain partitions that are acted on by the corresponding DDL/DML statements. In some cases, execution of parallel statements becomes possible, i.e., when the statements are not operating on overlapping partitions.

Various other improved execution of partition-related DDL/DML statements may be achieved. In the case of an "alter table add partition from others" statement, the parameter dynamic range is a special partition scheme which manages partitions automatically. An exemplary statement to create a dynamic range partitioning table is as follows.

CREATE TABLE T (A INT NOT NULL) PARTITION BY RANGE(A) (PARTITION 0<=VALUES<1000, PARTITION 1000<=VALUES<2000, PARTITION DYNAMIC THRESHOLD 1)

If records are present in a partition others partition, which is specified as an OTHERS partition with a dynamic property (as shown above), a new partition may be created dynamically as new records are inserted or updated. The most frequently used DDL for dynamic range is "ALTER TABLE ADD PARTITION FROM OTHERS". Which can split data in one or more partition others partitions into newly created range partitions.

Although the above DDL statement only operates on table metadata and records in the partition others partition, conventional table locking mechanisms would require that the statement acquire an exclusive (X) table lock for the entire table. Locking the entire table prevents parallel insert/update/delete on existing partitions other than the partitions other partitions, even though these existing partitions are not affected by the above DDL. Using partition locking mechanisms consistent with the present teachings, executes the above DDL which only needs operate on specified partitions, to only take out locks on the specific partitions on which the statement operates, thereby providing improved concurrency between transactions. In this example, partitions are locked as follows. First, an intent exclusive (IX) lock is acquired for table T metadata. Next, an X lock is acquired on the metadata record. Table metadata locks and partition data locks are object lock items. Metadata record locks and data record locks are record lock items. Database management systems employ different types of locks to ensure atomicity, consistency, isolation, and durability (ACID) of a transaction. Metadata record locks may be employed by a database management system in connection with DDL operations once execution of a DDL statement causes a metadata lock to be acquired and before such execution modifies metadata. This is to enable acquisition of a metadata record X lock. Consistent with the present teachings optimized DDL operations are executed sequentially.

Finally, an X lock on the data part of the partition others partition, and the DDL may be executed and committed. By performing partition locking in this way, an IX lock on table T metadata allows parallel reads from this table and allow concurrent DML compilation and/or execution. Furthermore, in order to ensure that there is at most one DDL operation on the table at any moment of time, an additional lock has to be acquired by every DDL operation, because there are cases where only a subset of locks of the table are acquired by a DDL operation. The metadata of a table can be regarded as a record in the metadata container, and therefore the X lock of the metadata record acts as a lock preventing concurrent DDL operations on the table. Last, to ensure there is no data inserted into OTHERS partition before committing the transaction, the X lock on the partition others partition is acquired. Such partition locking mechanisms, allow concurrent DML to operate on unrelated partitions, especially in a multi-partitioned table. Meanwhile, such an approach ensures that only one DDL statement is executing at any particular time by acquiring the associated metadata record lock. Accordingly, transaction isolation is provided, and concurrency is improved.

Another improvement relates to facilitating increased performance of a repartition of a partitioned database table. The DDL fragment "ALTER TABLE PARTITION BY . . . " is an important DDL operation with respect to creation and maintenance of partitions in a partitioned database table. This DDL operation may be used to redefine partition metadata for the partitioned database table. Execution of the operation may have significant consequences potentially involving movement of vast quantities of data. Thus, any such repartition operation may involve a time-consuming DDL execution. In some cases, such a repartition may cause an underlying database system to block (and therefore become unavailable from the user's perspective) for several hours or more for application environment hosting billions of records, which would typically require planned system down time. For such a resource intensive operation, improvements based on partition locking vastly improves performance and transactional concurrency. Partition locking for repartition operations may be performed as follows. First, an IX lock is acquired for table T metadata. Next, an X lock is acquired on the metadata record. Next, an X lock on the data part of any partitions that will need data movement or be dropped. Finally, the DDL may be executed and committed, with the resulting new partitions having their corresponding data records based on the partition keys of the corresponding data records. As above, a metadata record lock is needed to ensure DDL isolation. Related partitions X lock are acquired to ensure no data modifications are performed by parallel DML operations. For those partitions that didn't participate in repartition, no partition level lock needs to be acquired. The fewer the partitions that are affected in a repartition DDL operation, the more concurrency is allowed. Such improved concurrency improves user experience and can potentially reduce any need for database system downtimes and/or maintenance windows.

Range partitioning creates dedicated partitions for certain values or value ranges in a table. Usually, this requires an in-depth knowledge of the values that are used or valid for the chosen partitioning column. For example, a range partitioning scheme can be chosen to create one partition for each calendar month. Software applications using a partitioned database table may choose to use range partitioning to actively manage the partitioning of a partitioned table. That is, partitions may be created or dropped as needed. For example, an application may create a partition for an upcoming month so that new data is inserted into that new partition.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

FIG. 1 is a system diagram 100 illustrating an example database system 105 for use in connection with the current subject matter. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
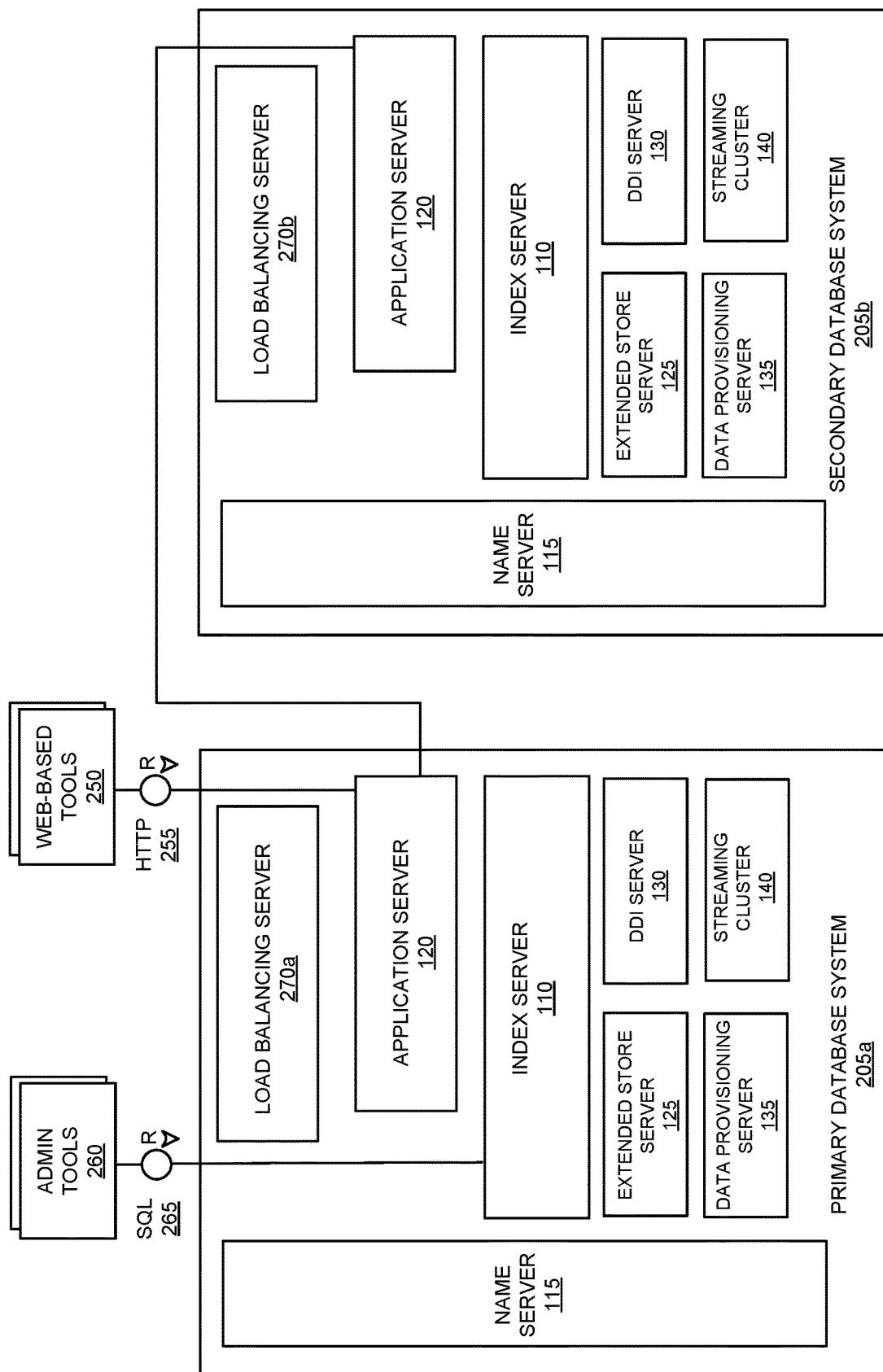
FIG. 2 is a system diagram illustrating an architecture to support load balancing between a primary database system and a secondary database system.

FIG. 2 is a system diagram illustrating an architecture 200 to support load balancing between a primary database system 205a and a secondary database system 205b consistent with the present teachings. Each of the primary system 205a and the secondary system 205b may be a single instance system, similar to database system 105 depicted in FIG. 1, or each may be a distributed variation of database system 105. Such an architecture may be useful in a high availability data system, or in a disaster recovery system, or in a combination high availability disaster recovery system.

Each of the primary system 205a and secondary system 205b may include a load balancing functionality. Such load balancing functionality may for example be contained within a distinct load balancing server 270a or 270b. But such load balancing functionality may be managed by any suitable processing system. For example, application server 120 of FIG. 1 may also manage the load balancing of requests issued to the application server of the primary system 205a, sending requests to the secondary system 205b as necessary to maintain a well-distributed workload.

As depicted in FIG. 2, each of the primary system 205a and the secondary system 205b includes load balancing server 270a and 270b which respectively receive requests from user applications directed to the primary system 205a or the secondary system 205b. Such request may come from either admin tools 260 or web-based tools 250, or any other user application. Upon receiving a request, a load balancing server, e.g., load balancing server 270a, determines how to distribute associated workload. As depicted, load balancing server 270a routes an SQL request 265 from admin tools 260 to index server 110 of primary system 205a, while routing an HTTP request 255 from web-based tools 250 to application server 120 of secondary system 205b.

Load balancing of resources between primary system 205a and secondary system 205b may give rise to several complicating issues. For example, if either of requests 255, 265 requires writing to one or more data tables, or modifying a data table, then the two systems 205a, 205b may diverge. After many instances of write requests being distributed between primary system 205a and secondary system 205b, the two systems would be substantially inconsistent, and likely unsuitable as replacements for each other. In another example, an application request, e.g., 265, may perform a write transaction that is followed by a read transaction, e.g., 255, related to the data written by the write request 265. If the write request is allocated to the primary system 205a, the read request would obtain a different result depending on whether the subsequent read transaction is carried out by the primary system 205a or by the secondary system 205b.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Load balancing may also be advantageously carried out in connection with partitioned database tables, involving database tables which content is separated into multiple partitions. In some cases, software instances of multiple database management systems, or nodes, may be distributed across multiple hosts, such as primary system 205a or by the secondary system 205b. It is understood that any number of hosts may be present in a landscape of distributed database management systems. In some other cases, multiple database management system nodes may be present on a single host. Hosts may be geographically dispersed for reasons of data security or physical network latency. In cases where a plurality of database management system nodes are resident on a respective plurality of physical hosts, all of the partitions associated with a partitioned database table may be stored in one or more data storage media associated with each of the nodes. In some other cases, only some of the partitions are stored in connection with a particular node.

Figure 3:
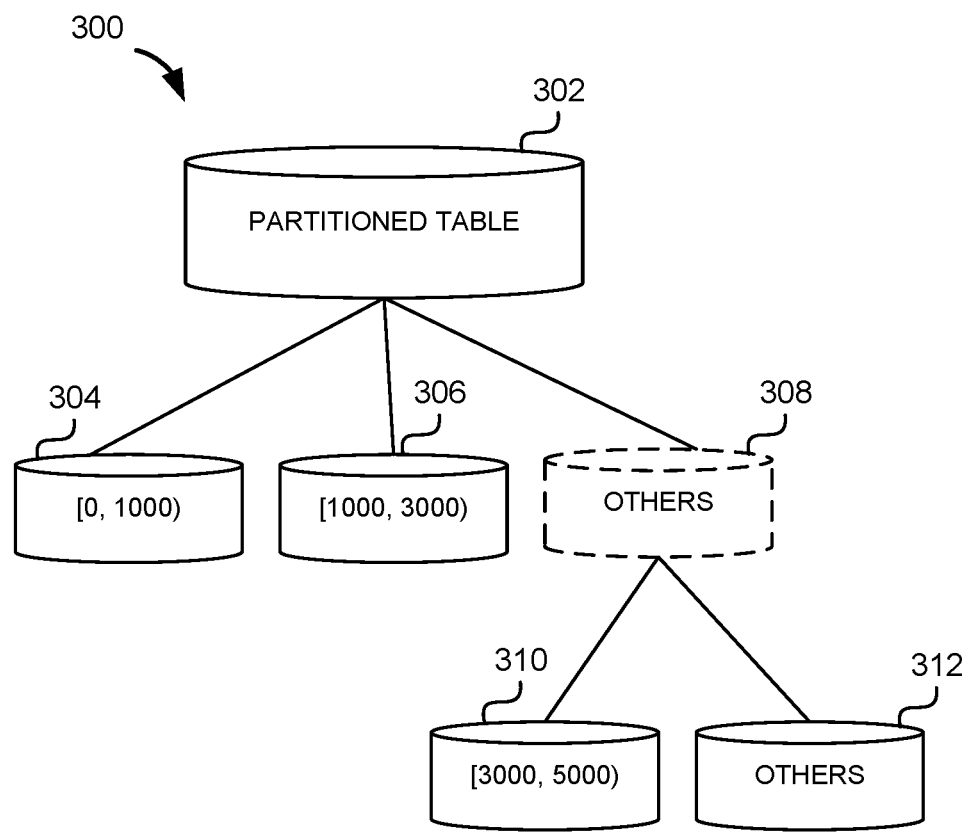
FIG. 3 is a data storage diagram illustrating a partition associated with a partitioned table before and after adding a new partition and a new partition others partition from an existing partition others partition.

FIG. 3 is a data storage diagram 300 illustrating a partition associated with a partitioned table before and after adding a new partition and a new partition others partition from an existing partition others partition. As shown, partitioned table 302 has been created with several range-based partitions, namely existing partition 304 and existing partition 306. Existing partition 304 was initially created with the range from 0 up to (but not including) 1000. This range may correspond to various application-specific attributes. In some cases, this may correspond to an invoice number, a serial number of a particular product, or any other increasing value associated with an application that falls into the indicated range. In connection with FIG. 3, existing partition 306 has been set up to contain rows with a key value corresponding to the range from 1000 up to 3000. Partition others partition 308 is used to store (or provide a pointer to) all other records that do not fit into existing partition 304 or existing partition 306. In addition to the first-level partitions, partitioned table 302 has been created and altered with an additional DDL statements and associated parameters.

Dynamic interval and dynamic threshold are two possible parameters associated with an OTHERS' property associated with a dynamic range characteristic of partitioned database tables. In connection with the dynamic threshold parameter, if the number of records in a partition others partition exceeds a threshold value in the DDL statement, new partitions may be created dynamically from contents of the partition others partition. With respect to the dynamic interval parameter, the range interval associated with new partition may be set to the interval value as provided in a particular DDL statement.

Accordingly, various ways are provided to create new partitions from a partition others partition. For example, the following statement creates a partitioned database table with a partition others partition having a dynamic threshold with a threshold value of 2000:

CREATE TABLE T (A INT NOT NULL) PARTITION BY RANGE(A) (PARTITION 0<=VALUES<1000, PARTITION 1000<=VALUES<3000, PARTITION OTHERS DYNAMIC THRESHOLD 2000)

Next, records may be inserted into partitioned table 302 as follows.

INSERT INTO T VALUES(3500)
INSERT INTO T VALUES(4999)

These records have key values that are out of range of the existing ranges associated with existing partition 304 and existing partition 306. In this example, when record having key values that are out of range of existing partition 304 and existing partition 306, the record is inserted into partition others partition 308. In order to automatically generate a new partition from the records in a partition others partition such as partition others partition 308. An alter table statement may be issued as follows.

ALTER TABLE T ADD PARTITION FROM OTHERS

Upon execution of the above DDL statement, one or more new partitions 310 is created. In some embodiments, only the partition having the range needed to store the inserted row is created. In some other embodiments, all intervening partitions are created between the highest range-value existing partition and the new range value associated with the key value of the inserted row. For example, should the inserted row have a key value of 4500, since a dynamic threshold of 2000 was specified in the corresponding DDL, a single partition, namely new partition 310 is created and the inserted row is inserted into new partition 310. In some embodiments, any rows that belong in new partition 310 will be migrated from partition others partition 312. This migration may occur in the background when, for example, the database management system is either idle or under something less than full loading of its computational capacity. If the inserted record has a key value of 6500, then such a record will be may inserted in the second-level partition others partition 312. In some embodiments, in connection with a dynamic threshold, if a number of records in partition others partition 308 meets or exceeds the corresponding threshold value, new range partition 310 and new partition others partition 312 may be created to replace the previous partition others partition 308. In this case, the rows from previous partition others partition 308 may be moved to newly created partition 310 and newly created partition others partition 312, and previous partition others partition 308 may be removed or otherwise associated storage reallocated. In this embodiment, after removal of previous partition others partition 308, the partitions of the partitioned database table will each be returned to a single level.

Figure 4A:
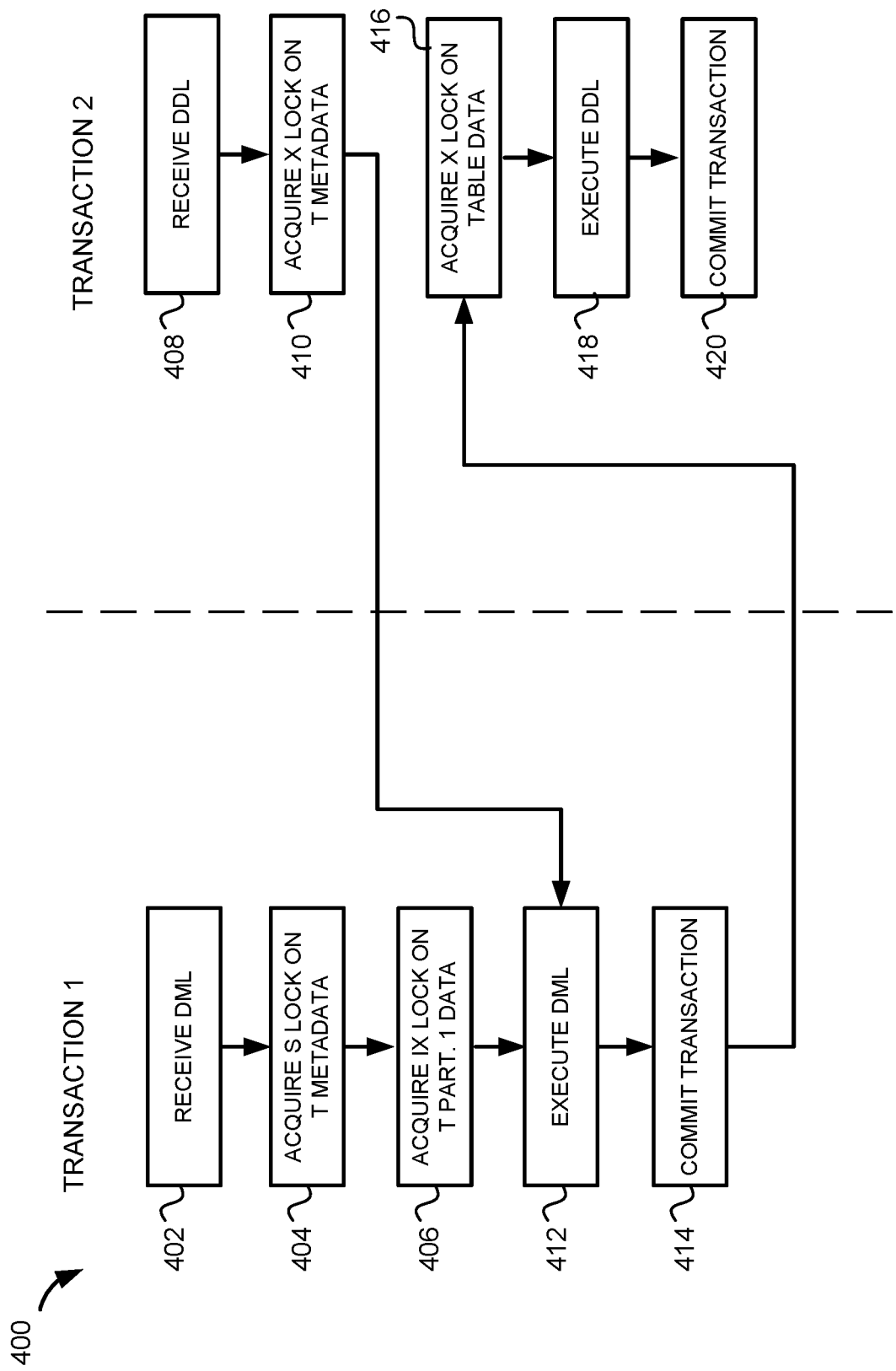
FIG. 4A is a swim lane diagram illustrating methods for utilizing partition-based locking mechanisms to improve execution of overlapping data definition language (DDL) and data manipulation language (DML) operations.

FIG. 4A is a swim lane diagram 400 illustrating methods for utilizing partition-based locking mechanisms to improve execution of overlapping data definition language (DDL) and data manipulation language (DML) operations in connection with a first and second transaction. At step 402, one or more DML statements associated with a first transaction on a first table partition is received, by a first database node.

At step 404, a first-node intent exclusive lock on table metadata associated with the partitioned database table is acquired, by the first database node for the first transaction. In some embodiments partition locks may be implemented as database object locks comprising metadata and partition data locks. For transactions comprising a DDL operation that acquires an X lock on a particular partitioned database table table, the DDL operation first acquires an overall metadata X lock starting from a lowest numbered volume identifier to a largest volume identifier. Subsequently, the DDL operation acquires each data X lock in a corresponding sequence. If a separate transaction executes a DML operation, the DML operation first acquires one metadata IX lock for compilation and subsequently acquire locks for the data which it needs to modify by way of an IX lock.

At step 406, a second-node intent exclusive lock is acquired on table data of the first table partition by the second database node. When a database object is subject to an IX lock, subsequent incoming X lock requests for the database object by other transactions are blocked, whereas subsequent IX locks are allowed. When an object has an X lock on it, all other lock requests by other transactions are blocked.

In some embodiments, in parallel to processing the above DML statement on the first node, a DDL statement may be initiated on a second database node. In response to receiving (at step 408), by the second database node, a DDL statement associated with a second transaction operating on the partitioned database table several steps are performed to acquire necessary partition-based locks for carrying out the DDL statement. In some embodiments, the DDL statement is an ALTER TABLE statement that adds a multilevel range partition to a partition others partition in the partitioned table. In some other embodiments, the DDL statement is an ALTER TABLE PARTITION BY statement that redefining partition metadata for the partitioned table. In some embodiments, the DDL operation is a repartition operation, and an exclusive partition data lock is acquired on table data associated with one or more partitions that will be moved or dropped in connection with the first transaction. At step 410, a second-node exclusive lock is acquired, by the first database node, on second-node table metadata associated with the partitioned database table. Subsequently to acquiring the X lock at step 410, execution of the second transaction blocks and proceeds to step 412 awaiting completion of the first transaction. At step 412, operations associated with the one or more DML statements are executed by the second database node. Finally, in response to determining that the operations associated with the one or more DML statements have successfully completed, the first transaction completes with a commit of the first transaction and execution proceeds to step 416.

At step 416, a partition exclusive lock is acquired on second-node table metadata, by the second database node. In some embodiments, it is determined at step 416 which partitions are needed to perform the DDL operation of the second transaction. In these embodiments, only those partitions that are needed by the DDL operation are locked. In some other embodiments, the partition exclusive lock acquired at step 416 is an all-partition exclusive lock. Next, at step 418, operations associated with the one or more DDL statements are executed by the first database node. Finally, at step 420, in response to determining that the operations associated with the one or more DDL statements have successfully completed, a commit of the first transaction is performed.

Figure 4B:
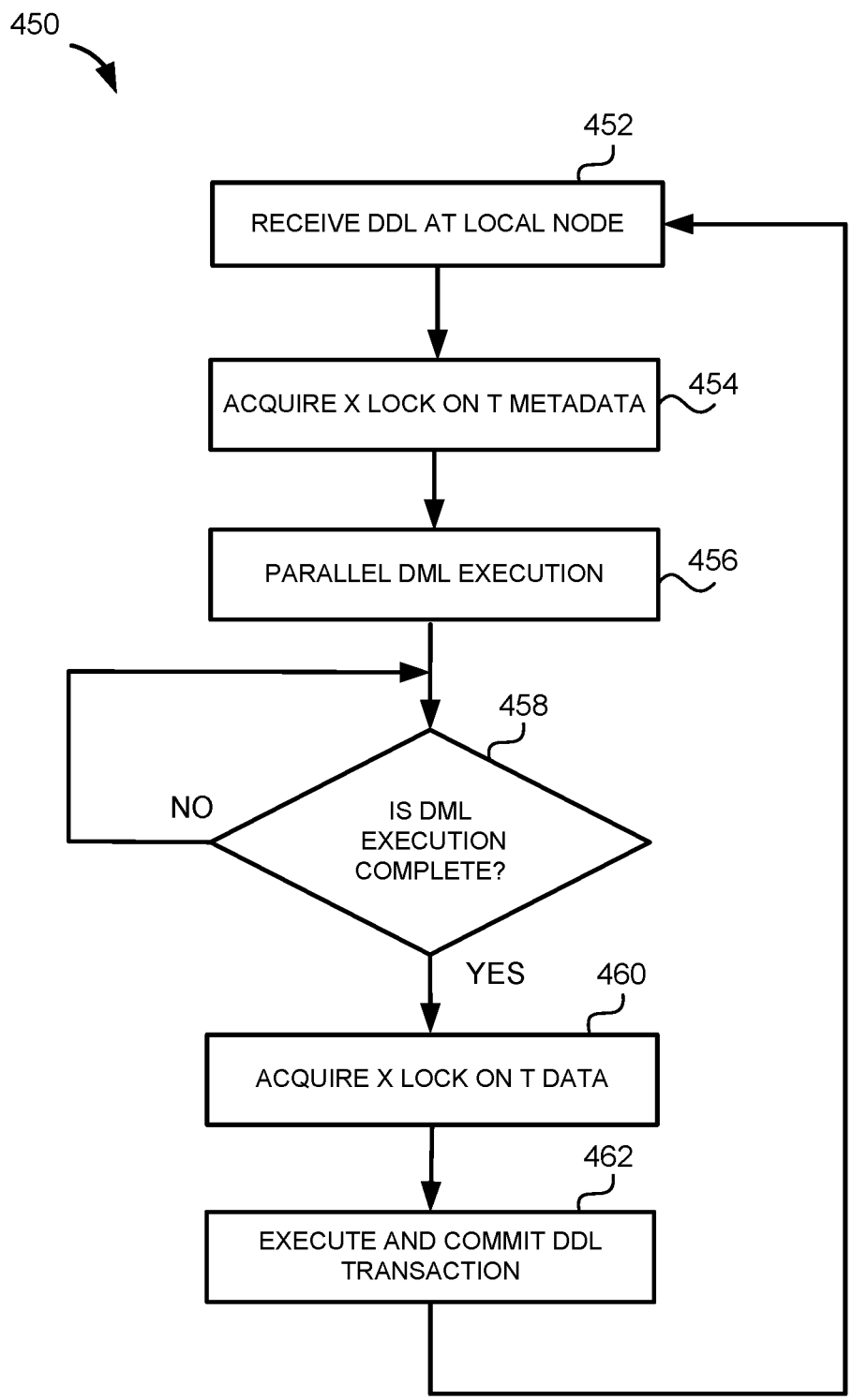
FIG. 4B is a flow diagram from the perspective of a node executing a DDL operation in parallel with another node executing a DML operation.

FIG. 4B is a flow diagram 450 from the perspective of a node executing a DDL operation in parallel with another node executing a DML operation. At step 452, a DDL statement may be received at a local database node operating on a partitioned database table. In some embodiments, the DDL statement is an ALTER TABLE statement that adds a multilevel range partition to a partition others partition in the partitioned table. In some other embodiments, the DDL statement is an ALTER TABLE PARTITION BY statement that redefining partition metadata for the partitioned table. In some embodiments, the DDL operation is a repartition operation, and an exclusive partition data lock is acquired on table data associated with one or more partitions that will be moved or dropped in connection with the first transaction.

At step 454, a local-node exclusive lock is acquired, by the local database node, on local-node table metadata associated with the partitioned database table. In parallel in a remote database node, a DML operation is executed on a partitioned table that is replicated across a database that is replicated between the local database node and the remote. At test 458, it is determined that the DML operation associated with step 456 has completed. If the DML operation has not completed, execution blocks until the DML operation has completed execution. Once DML execution is complete, the process continues to step 460 at which point the local node acquires an X lock on partition data associated with partitions relevant to the DDL operation. Finally, at step 462, the DDL operation executes and is committed to complete the DDL operation.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

The invention claimed is:

1. One or more non-transitory computer-readable media storing computer-executable instructions that, when executed by a processor, perform a method for utilizing partition-based locking mechanisms to improve execution of overlapping data definition language (DDL) and data manipulation language (DML) operations on a partitioned database table, the method comprising:
   receiving, by a first database node, one or more DML statements associated with a first transaction on a first table partition;
   acquiring, by the first database node, a first-node intent exclusive lock on table metadata associated with the partitioned database table for the first transaction;
   in response to receiving, by a second database node, a DDL statement associated with a second transaction operating on the partitioned database table:
      acquiring, by the second database node, a second-node exclusive lock on second-node table metadata associated with the partitioned database table;
      acquiring, by the second database node, a second-node intent exclusive lock on table data of the first table partition;
      acquiring, by the first database node, a first-node exclusive lock on first-node table metadata;
      executing, by the second database node, operations associated with a first one of the one or more DML statements; and
      in response to determining that the operations associated with the one or more DML statements have successfully completed, committing the second transaction;
   acquiring, by the first database node, an exclusive lock on first-node table metadata data;
   acquiring, by the second database node, an all-partition exclusive lock on table data of each of the partitions of the partitioned table;
   executing, by the first database node, operations associated with the DDL statement; and
   in response to determining that the operations associated with the DDL statement have successfully completed, committing the first transaction.

2. The non-transitory computer-readable media of claim 1, wherein the DDL statement is an ALTER TABLE statement that adds one or more threshold dynamic range partitions to the partitioned table.

3. The non-transitory computer-readable media of claim 1, wherein the DDL statement is an ALTER TABLE PARTITION BY statement that redefines partition metadata for the partitioned table.

4. The non-transitory computer-readable media of claim 3, wherein the method further comprises:
   acquiring, by the first database node, one or more first-node exclusive partition data locks on table data associated with one or more partitions that will be moved or dropped in connection with the first transaction.

5. The non-transitory computer-readable media of claim 1, wherein the partitioned database table is an interval range partitioned database table having a plurality of interval range-based table partitions.

6. The non-transitory computer-readable media of claim 5, wherein the one or more DML statements includes an INSERT statement inserting one or more new records into one or more of the plurality of interval range-based table partitions.

7. The non-transitory computer-readable media of claim 1, wherein the first database node and the second database node are hosted on a first database server host and on a second database host respectively.

8. A method for utilizing partition-based locking mechanisms to improve execution of overlapping data definition language (DDL) and data manipulation language (DML) operations on a partitioned database table, the method comprising:
   receiving, by a first database node, one or more DML statements associated with a first transaction on a first table partition;
   acquiring, by the first database node, a first-node intent exclusive lock on table metadata associated with the partitioned database table for the first transaction;
   in response to receiving, by a second database node, one or more DDL statements associated with a second transaction operating on the partitioned database table:
      acquiring, by the second database node, a second-node exclusive lock on second-node table metadata associated with the partitioned database table;
      acquiring, by the second database node, a second-node intent exclusive lock on table data of the first table partition;
      acquiring, by the first database node, a first-node exclusive lock on first-node table metadata;
      executing, by the second database node, operations associated with the one or more DML statements; and
      in response to determining that the operations associated with the one or more DML statements have successfully completed, committing the second transaction;
   acquiring, by the first database node, an exclusive lock on first-node table metadata data;
   acquiring, by the second database node, an all-partition exclusive lock on table data of each of the partitions of the partitioned table;
   executing, by the first database node, operations associated with the one or more DDL statements; and
      in response to determining that the operations associated with the one or more DDL statements have successfully completed, committing the first transaction.

9. The method of claim 8, wherein the DDL statement is an CREATE TABLE statement that adds an interval range partition to a partition others partition in the partitioned table.

10. The method of claim 9, wherein the DDL statement is an ALTER TABLE PARTITION BY statement redefining partition metadata for the partitioned table.

11. The method of claim 8, further comprising:
acquiring, by the first database node, one or more first-node exclusive partition data lock on table data associated with one or more partitions that will be moved or dropped in connection with the first transaction.

12. The method of claim 11, wherein the partitioned database table is a range partitioned database table having a plurality of range-based table partitions.

13. The method of claim 8, wherein the one or more DML statements includes an INSERT statement inserting one or more new records into one or more of the partitions.

14. The method of claim 8, wherein the first database node and the second database node are hosted on a single database host server.

15. A system for utilizing partition-based locking mechanisms to improve execution of parallel database object modifying operations and database table altering operations on a partitioned database table, the system comprising:
at least one processor;
and at least one non-transitory memory storing computer executable instructions that when executed by the at least one processor cause the system to carry out actions comprising:
receiving, at a first database host, one or more database table altering statements associated with a first transaction on a first table partition;
acquiring, by the first database host, a first-host intent exclusive lock on table metadata associated with the partitioned database table for the first transaction;
in response to receiving, by a second database host, at least one sequential object modifying statement associated with a second transaction operating on the partitioned database table:
acquiring, by the second database host, a second-host exclusive lock on second-host table metadata associated with the partitioned database table;
acquiring, by the second database host, a second-host intent exclusive lock on table data of the first table partition;
acquiring, by the first database host, a first-host exclusive lock on first-node table metadata;
executing, by the second database node, operations associated with the one or more database table altering statements; and
in response to determining that the operations associated with the one or more database table altering statements have successfully completed, committing the first transaction;
acquiring, by the first database host, an exclusive lock on first-host table metadata data;
acquiring, by the second database host, an all-partition exclusive lock on table data of each of the partitions of the partitioned table;
executing, by the first database host, operations associated with the at least one sequential database object modifying statement; and
in response to determining that the operations associated with a last one of the at least one sequential database object modifying statement has successfully completed, committing the second transaction.

16. The system of claim 15, wherein the database object modifying statement is an ALTER TABLE statement that adds an interval range partition to a partition others partition in the partitioned table.

17. The system of claim 15, wherein the database object modifying statement is an ALTER TABLE PARTITION BY statement that redefining partition metadata for the partitioned table.

18. The system of claim 15, wherein the actions further comprise:
acquiring, by the first database node, one or more first-node exclusive partition data lock on table data associated with one or more partitions that will be moved or dropped in connection with the first transaction.

19. The system of claim 18, wherein the partitioned database table is a range partitioned database table having a plurality of range-based table partitions.

20. The system of claim 15, wherein the one or more database table altering statements includes an INSERT statement inserting one or more new records into one or more of the partitions.

* * * * *